Oct. 9, 1951   A. L. DOW ET AL   2,570,434
CANOPY ACTUATING MECHANISM
Filed July 23, 1948   3 Sheets-Sheet 2

INVENTOR.
Arthur L. Dow
BY Andrew J. Nelson

M. B. Tasker
ATTORNEY

*INVENTOR.*
Arthur L. Dow
Andrew J. Nelson
BY

*ATTORNEY*

Patented Oct. 9, 1951

2,570,434

UNITED STATES PATENT OFFICE 2,570,434

CANOPY ACTUATING MECHANISM

Arthur L. Dow, Easton, and Andrew J. Nelson, Stratford, Conn., assignors to United Aircraft Corporation, East Hartford, Conn., a corporation of Delaware Application July 23, 1948, Serial No. 40,304

7 Claims. (Cl. 268—50)

This invention relates to aircraft and particularly to power operated mechanism for controlling the movements of a cockpit canopy and the like.

It is an object of this invention to provide a fluid operated mechanism for moving an aircraft cockpit canopy including a strut having internal control means to selectively extend, retract, or lock the canopy in any intermediate position.

It is a further object of this invention to provide a fluid operated mechanism for moving aircraft canopies and the like wherein the mechanism comprises a strut having internal valve means for effectively controlling the flow of fluid to permit manual operation of the canopy.

It is a still further object of this invention to provide in combination with the canopy operating mechanism, a control for selecting working fluid from a plurality of sources.

Another object of this invention is to provide a fluid operated cockpit canopy actuating strut having internal valve mechanism which can cause the strut to stop at any position intermediate the fully extended and retracted positions.

A further object of this invention is to provide a cockpit canopy actuating mechanism wherein the canopy is normally moved by hydraulic pressure and is opened by a high pressure gaseous fluid during emergency conditions.

These and other objects and advantages of this invention will become apparent from the following detailed description of the drawings wherein a preferred embodiment has been illustrated.

In the drawings,

Fig. 7 is an isometric partial cross sectional view of the internal slider valve.

Figure 1:
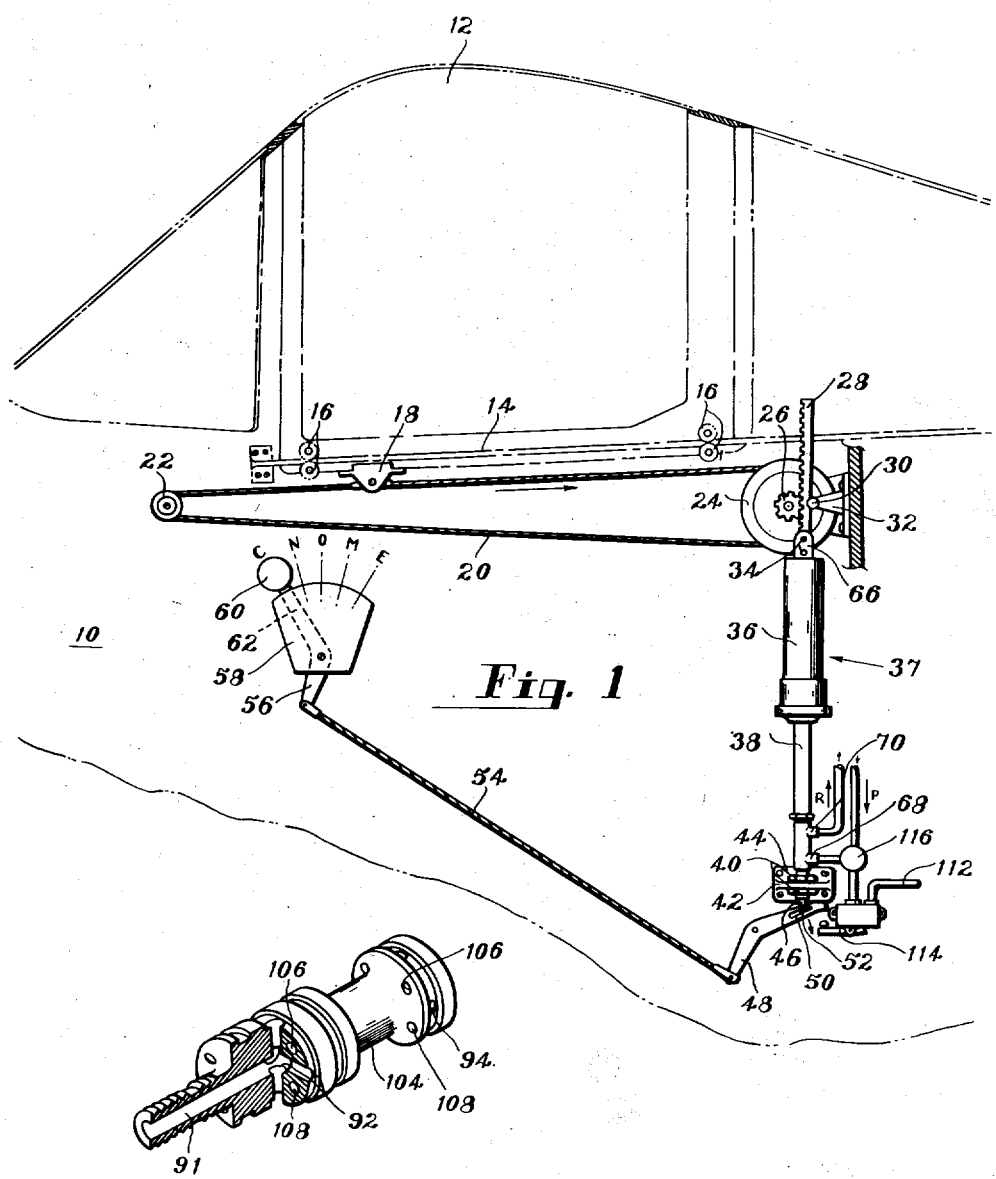
Fig. 1 is a side elevation of an aircraft cockpit section showing a fluid operated mechanism according to this invention for controlling a cockpit sliding canopy.

Referring now to Fig. 1, the numeral 10 indicates the cockpit section of the fuselage of an airplane having a sliding canopy enclosure 12. Canopy 12 is faired into the fuselage and windshield in the usual manner and is moved to an open or a closed position by sliding on rail 14, being guided by rollers 16 which keep it in correct alignment during fore and aft travel. The canopy 12 carries a fitting 18 which is mounted in such a manner that it will not interfere with other aircraft structure during canopy movement. The fitting 18 is attached to an endless cable 20 which rides around small pulley 22 and large pulley 24, the pulleys 22 and 24 being rotatably mounted on aircraft structure and spaced from each other at a distance sufficient to allow adequate fore and aft movement of canopy 12. Pulley 24 carries an integral pinion gear 26 which cooperates with a rack 28. A roller 30 which is mounted to the aircraft by an arm 32 insures positive engagement of the rack 28 with the pinion 26.

It can thus be seen that any linear movements of rack 28 will cause rotary movements of pinion 26 and the pulley 24. Rotation of pulley 24 moves the endless cable 20 thereby imparting linear motion to the canopy 12, the direction of motion of the canopy being dependent on the direction of travel of the rack 28.

The purpose of rack 28 is to transmit motion from the actuating strut 37 to the canopy. To this end the rack 28 is attached at its lower end 34 to cylinder 36 of the actuating strut 37. Cylinder 36 is slidable over hollow piston rod 38 which is rigidly fixed to aircraft structure by means of nuts 40 threaded onto the rod 38 which passes through web 42 of bracket 44. A hollow internal valve control rod 46, which is slidable within hollow piston rod 38 and is connected to bell crank 48 by means of a slot 50 and pin 52, is provided to permit selective control of the actuating strut 37. The other end of bell crank 48 is interconnected by a link 54 to another bell crank 56 located in the cockpit of the aircraft and partially enclosed in a casing 58. A ball 60 is attached to leg 62 of bell crank 56 to provide a control handle for the pilot. It can thus be seen that any movements of handle 60 and the bell crank 56 by the pilot will cause link 54 to move bell crank 48 thereby imparting reciprocal motion to the internal valve control rod 46 which controls the direction of actuation of the strut 37.

The pilot has a choice of several conditions under which he may desire to move the canopy or cause it to be moved. Logically, the forwardmost position of the handle 60 is the position into which the handle 60 must be moved to close the canopy. The casing 58 carries five handle position notches which are shown in Fig. 1 as C, N, O, M, E and represent the closed, neutral, open, manual and emergency selective positions, respectively. Positions C, N, O and M represent the normal range of throw of the control with position E being used only in case of emergency. The effect of each of these control handle positions on the operation of the actuating mechanism will become apparent from the detailed description of the strut 37.

Figure 2:
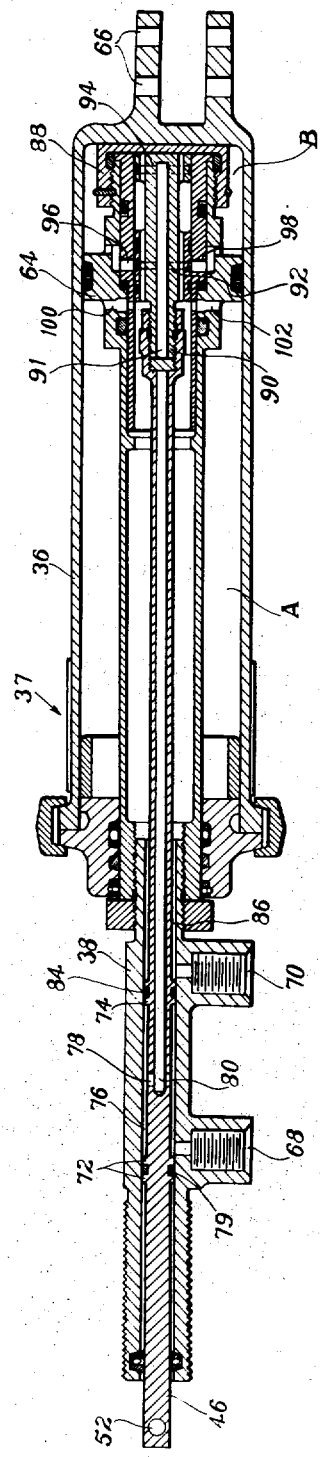
Fig. 2 is a cross sectional view showing the hydraulic strut of this invention in a completely retracted position (canopy open) with the internal slide valve moved to a position which will cause the strut to extend.

Referring now to Fig. 2 the actuating strut 37 primarily consists of a cylinder 36 which has its closed end connected to the rack 28 and has a piston 64 slidably mounted therein.

The hollow piston rod 38 has one end firmly secured to the aircraft while the other end of rod 38 is attached to the piston 64. Thus when fluid under pressure is admitted to the strut the piston 64 and the piston rod 38 remain stationary while the cylinder 36 is actuated to impart motion to the rack 28.

Fluid is admitted to and returned from the strut 37 through the ports 68 and 70 which are located on the fixed hollow piston rod 38. Port 68 is connected to pressurized hydraulic fluid in the aircraft while port 70 provides the exit to the return lines of the hydraulic system of the airplane. The hollow valve control rod 46 mentioned previously in connection with Fig. 1, is slidably mounted within the hollow piston rod 38 and carries pairs of lands 72 and 74 thereby forming an annular chamber 76 between the internal wall of the piston rod 38 and the external wall of valve control rod 46. Packing rings 79 and 84 are fitted between each of the pairs of lands 72 and 74, respectively, to seal chamber 76. Pressurized hydraulic fluid from the hydraulic system is normally admitted through port 68 into the chamber 76 and flows, via the port 78 located on the rod 46 between the lands 72 and 74, to the central chamber 80 inside valve rod 46.

The lands 74, in addition to sealing chamber 76, also forms a separation in the annular space between the piston rod 38 and the control rod 46 so as to form an additional annular chamber 86. The cap 88 adjacent the closed end of the cylinder 36 forms the other end closure for defining chamber 86 and also secures the piston 64 to the end of piston rod 38. Chambers 86 communicates with port 70 to convey return hydraulic fluid from the strut to the aircraft hydraulic system.

It can be seen that the direction of movement of the cylinder 36 is dependent upon hydraulic fluid under pressure being directed to either side of the piston 64. To this end the fluid is controlled by the slide valve 90 which is located within the hollow piston rod 38 and connected to rod 46 adjacent the piston 64.

The movements of the hollow internal valve rod 46 are completely independent of the piston rod 36 since valve rod 46 is actuated directly by the pilot as he moves handle 60 in the cockpit. In order to produce the various movements of the cylinder 36, hydraulic fluid under pressure must be fed to either chamber A or chamber B (Fig. 2) on either side of piston 64. To accomplish this, the slide valve 90 (a detail view of which is shown in Fig. 7) is threaded onto rod 46 in a manner that permits communication between the central chamber 80 of rod 46 and the drilled passage 91 of valve 90. There are several lands and grooves on valve 90 for reasons that will become more apparent as the description progresses. Valve 90 carries two sets of ports 92 and 94, both sets being spaced apart and each consisting of a pair of holes drilled at right angles to each other and intersecting at the drilled passage 91.

Piston 64 contains drilled passages 96 and 98 on one side thereof which communicate with area B and passages 100 and 102 which communicate with area A. As shown in Fig. 2, ports 92 of valve 90 are in registry with ports 96 and 98, so that in this position of the valve fluid is allowed to pass into area B thus causing the cylinder 36 to extend. As the cylinder 36 extends due to hydraulic fluid entering area B, the fluid from area A is discharged through ports 100 and 102 into the annular chamber 86 and thence through port 70 to the return system. Extension of the cylinder and movement of the canopy toward the closed position is effected when the pilot's control handle is in the C position and the valve 90 is in the Fig. 2 position.

Fluid will continue to enter area B until the end of the travel of rack 28 is accomplished or until the slide valve 90 is moved to the neutral position.

Figure 3:
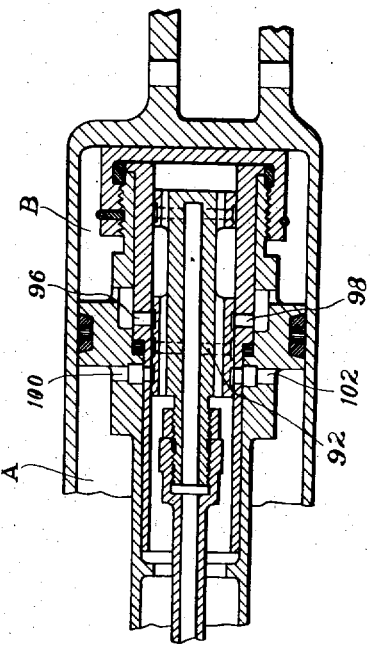
Fig. 3 is a partial cross section of one end of the hydraulic strut showing the piston and valve portion of the strut with the internal valve in a neutral or strut locked position.

To stop the flow of fluid to area B, the handle 60 is moved to the N position, thereby moving valve 90 to a position wherein port 92 is intermediate the pair of ports 96, 98 and 100, 102 as best shown in Fig. 3. In this position of the valve 90 no fluid is allowed to flow to either area A or area B and the strut will be locked against movement.

To retract the cylinder 36, the pilot moves handle 60 to the O position which causes port 92 of slide valve 90 to communicate with ports 100 and 102 (Fig. 4), thereby allowing fluid under pressure to enter area A. The fluid from area B will then be discharged through port 96 and 98 into chamber 86 and through port 70 to the airplane hydraulic system thereby actuating cylinder 36 toward its retracted position.

When manual operation of the canopy is desired, the pilot moves handle 60 to the M position. This brings the annular groove 104 on the valve 90 (Fig. 5) into a position which allows port 96 to communicate with port 100 and port 98 to communicate with port 102, thus allowing the fluid to flow freely between area A and area B to permit manual movement of the cylinder 36 and the canopy.

Figure 4:
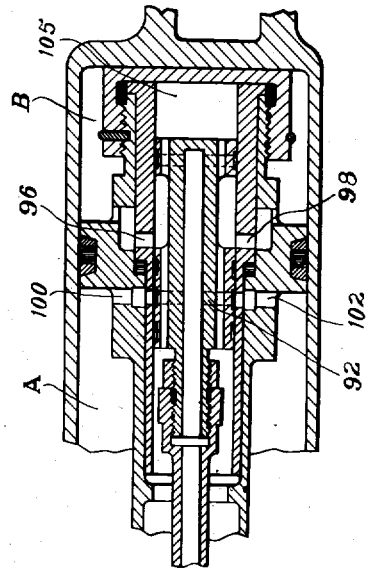
Fig. 4 is a partial cross section of the strut with the internal valve in a position which will cause the strut to retract
Figure 5:
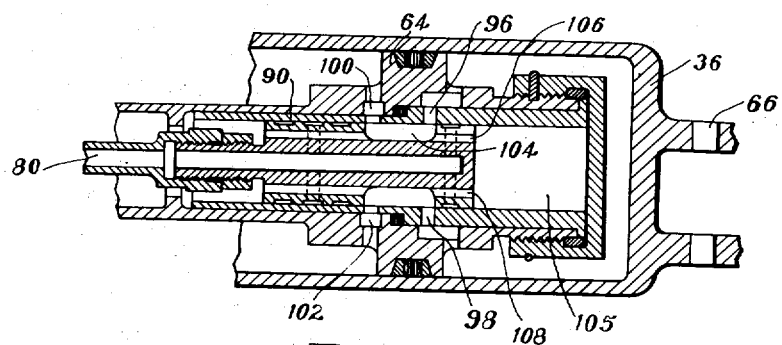
Fig. 5 is similar to Fig. 4 but shows the internal valve in a position which permits manual movement of the strut and canopy.

As seen in Figs. 4 and 5 a chamber 105 is formed between the inside portion of cap 88 and the end of valve 90 whenever the valve is moved away from the cap 88. The ports 106 and 108 (also seen in Fig. 7) are axially disposed through the valve 90 to allow direct communication between the chamber 105 and chamber 86 thus preventing fluid from being trapped in the chamber 105 during movement of the valve 90.

Figure 6:
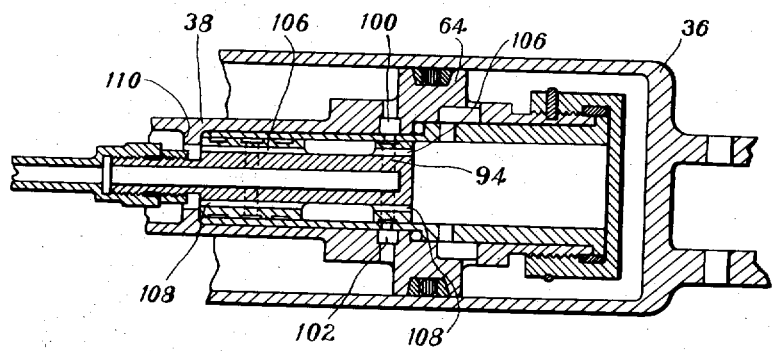
Fig. 6 is similar to Fig. 4 with the internal slide valve in a position which permits the emergency air to operate the strut.

In the event of an emergency exit from the cockpit or when the hydraulic system has failed, the pilot pushes handle 60 to the E position. In this position of the control handle the port 94 (Fig. 6) of valve 90 communicates with ports 100 and 102 in the piston 64 and the valve 90 is in its extreme left-hand position abutting flange 110 on the inner periphery of the hollow piston rod 38. When handle 60 is moved to position E, a high pressure air or $CO_2$ supply line 112 (Fig. 1) is opened as bell crank 48 strikes lever 114. The force of the high pressure air operates the shuttle valve 116 to shut-off the supply of hydraulic fluid and permit the air to flow into port 68. The air under pressure then enters chamber 80 (Fig. 6), passes through port 94 (also seen in Fig. 7) on the valve 90, thence flows through ports 100 and 102 into area A where the expanding air causes cylinder 36 to retract and move the canopy toward the open position. The hydraulic fluid in area B is vented under these conditions through ports 96 and 98 into chamber 105 and through ports 106, 108 into chamber 86 and thence out of port 70 to the return hydraulic system.

As a result of this invention it is evident that a power operated mechanism has been provided which permits selective movement of an aircraft canopy to an open, closed or intermediate position.

Further as a result of this invention a power operated fluid actuating mechanism has been provided for moving an aircraft canopy or the like which permits manual movement of the canopy by the operator and further provides for emergency operation with a separate auxiliary power source in the event of failure of the main source of power or in the event that rapid egress is necessary.

Still further, as a result of this invention, a remotely controlled strut mechanism has been provided for actuating a pilot's cockpit canopy or the like wherein the strut has a multi-position valve incorporated therein for selectively operating the strut responsive to movement of the pilot's manual control.

Although only a preferred embodiment of this invention has been described and illustrated, it will be evident that various modifications and changes can be made in the various parts and mechanism without departing from the scope of this novel concept.

We claim:

1. In an airplane, a slidable cockpit canopy, a power operated actuating strut for moving said canopy between open and closed positions and locking said canopy intermediate said positions including a valve incorporated within said strut, two sources of power each having a fluid transmitting connection with said valve for actuating said power operated strut, means common to both of said fluid connections for normally maintaining fluid communication between one of said sources and said valve and arresting communication between the other of said sources and said valve, pilot operated control mechanism operatively connected to said valve having a normal range of positions and an emergency position beyond its normal range, said mechanism in its normal range controlling said valve to direct power to either side of said strut and to lock said strut while said maintaining means is effective, and means associated with said pilot operated control mechanism and said valve operative when said control mechanism is moved to said emergency position for reversing said maintaining means to open fluid communication from the other of said sources through said valve to one side of said strut.

2. In an airplane, a sliding cockpit canopy, a fluid operated actuating strut for moving said canopy in two directions, a source of hydraulic fluid under pressure, a valve incorporated within said strut for selectively directing hydraulic fluid to either side of said strut to move said canopy in either of said directions, pilot operated control means operatively connected to said valve and having a normal range of control for moving said canopy in either of said directions, a source of gaseous fluid under pressure, and mechanism for directing said gaseous fluid to said strut to move said canopy in one of said directions in response to operation of said control means beyond said normal control range.

3. In an airplane, a slidable cockpit canopy, an actuating strut operatively connected to said canopy, sources of hydraulic fluid and gaseous fluid under pressure, valve means incorporated within said strut for selectively directing fluid to said strut to move said canopy and to hydraulically lock said canopy, means for normally maintaining fluid communication between said source of hydraulic fluid and said valve and restricting fluid communication between said source of gaseous fluid and said valve, pilot operated means operatively connected to said valve having a normal range of movement and an emergency position beyond said normal range, said valve being selectively positioned by said pilot operated means when the same is moved within its normal range of movement to direct fluid to either end of said strut and to lock said strut and being positioned by said pilot operated means when the same is moved to said emergency position to direct fluid to one end of said strut to open said canopy, and mechanism operatively associated with said pilot operated means for overriding said maintaining means to admit gaseous fluid to said valve when said pilot operated means is moved to its emergency position.

4. In an airplane according to claim 6 wherein the mechanism operative in response to movement of the pilot operated means to its emergency position directs said gaseous fluid to said valve and also cuts off the flow of hydraulic fluid to said valve.

5. In a fluid operated strut adapted to actuate an aircraft cockpit canopy, a movable cylinder, a rack rigidly attached to one end of said cylinder and operatively connected to the canopy, a stationary piston having a depending hollow piston rod, a source of fluid under pressure, port means carried by said rod for admitting fluid from said source to said strut, a valve within said rod adjacent said piston for directing said fluid to either side of said piston, a member axially disposed within said rod for manually controlling said valve including a central bore for returning fluid from said strut, and means carried by said valve for placing both sides of said piston in fluid communication to permit manual movement of said cylinder.

6. In a fluid operated strut for moving an airplane cockpit canopy and adapted to be selectively actuated by fluid from either of two sources, a cylinder, a piston within said cylinder, a hollow piston rod attached to said piston, a valve slidable within said rod having a normal range of movement for directing the flow of fluid to either side of said piston, an abutment on said rod for limiting the movement of said valve to effect an emergency position of the same beyond said normal range of movement for directing fluid to one side of said piston, fluid connections from each of said sources to said valve including a shuttle valve member common to both connections and normally maintaining a position to provide fluid communication between one of said sources and said valve and restricting fluid communication between the second of said sources and said valve, means carried by said valve for providing fluid communication between both sides of said piston, valve means closed during the normal range of movement of said valve for governing the fluid communication between the second of said sources and said shuttle valve member, a control member for manually moving said valve within its normal range of movement and into its emergency position, and means associated with said control member and operative when said valve is moved into its emergency position by said control member for opening said valve means on said second of said sources and reversing the position of said shuttle valve.

7. In a fluid operated strut for moving an airplane cockpit canopy and adapted to be actuated by fluid under pressure from either of two sources, a cylinder, a piston within said cylinder, a hollow piston rod attached to said piston including passages for admitting fluid therein and having a closure at one end, a valve slidable within said rod adjacent said closure for directing the flow of fluid from one of said sources to either side of said piston, a hollow control member within said rod for manually moving said valve including a central bore for exhausting fluid from either side of said piston, ports carried by said valve for providing fluid communication between both sides of said piston to permit manual operation of said strut, and port means included in said valve and continuously in registry with said bore for eliminating fluid entrapment between said valve and the closure on said piston rod.

ARTHUR L. DOW.
ANDREW J. NELSON.

REFERENCES CITED

The following references are of record in the file of this patent:

UNITED STATES PATENTS

| Number | Name | Date |
|---|---|---|
| 1,524,906 | Bosserdot | Feb. 3, 1925 |
| 1,622,391 | Quinn | Mar. 29, 1927 |
| 1,732,813 | Kasley | Oct. 22, 1929 |
| 1,790,620 | Davis | Jan. 27, 1931 |
| 1,919,443 | McCune | July 23, 1933 |
| 2,017,086 | Zouck | Oct. 15, 1935 |
| 2,089,932 | Conklin | Aug. 17, 1937 |
| 2,212,955 | Price et al. | Aug. 27, 1940 |
| 2,244,850 | Orshansky | June 10, 1941 |
| 2,247,141 | Twyman | June 24, 1941 |
| 2,270,059 | Kahr | Jan. 15, 1942 |
| 2,295,813 | Tucker | Sept. 15, 1942 |
| 2,433,420 | Booth | Dec. 30, 1947 |
| 2,490,174 | Teague | Dec. 6, 1949 |

Certificate of Correction

Patent No. 2,570,434                                               October 9, 1951

ARTHUR L. DOW ET AL.

It is hereby certified that error appears in the printed specification of the above numbered patent requiring correction as follows:

Column 6, line 32, for the claim reference numeral "6" read *3*; and that the said Letters Patent should be read as corrected above, so that the same may conform to the record of the case in the Patent Office.

Signed and sealed this 22nd day of January, A. D. 1952.

[SEAL]

THOMAS F. MURPHY,
*Assistant Commissioner of Patents.*